Sept. 8, 1925.  
T. MAJOR ET AL  
1,552,860
AUTOMATIC AUXILIARY AIR INTAKE VALVE FOR INTERNAL COMBUSTION ENGINES
Filed Sept. 25, 1924
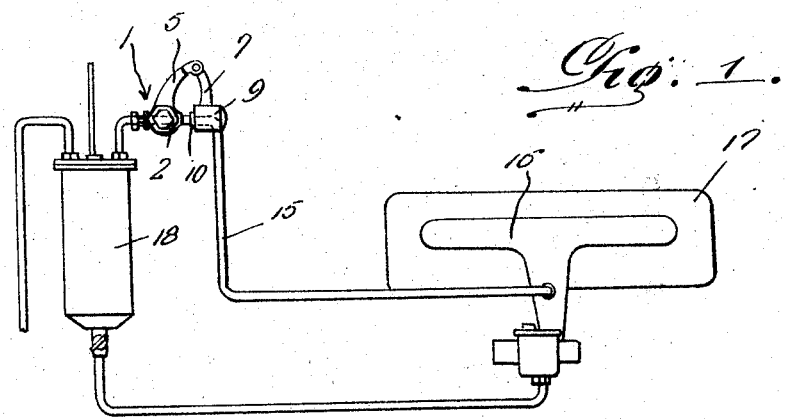
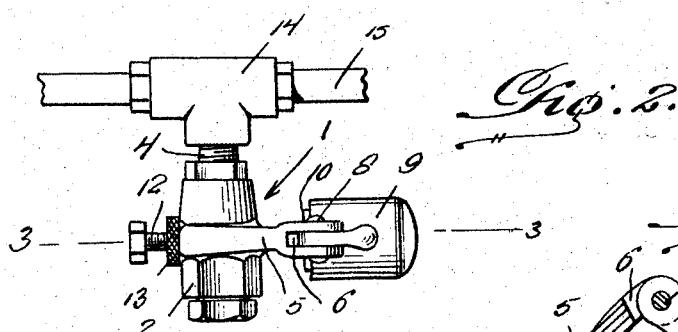
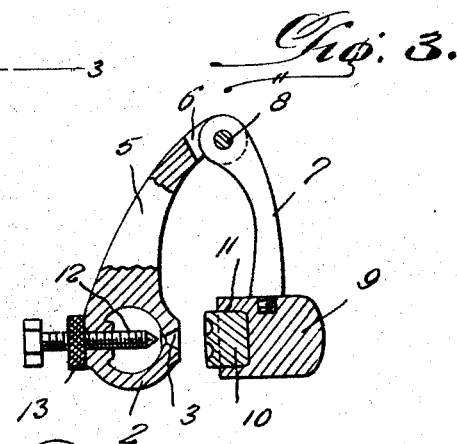
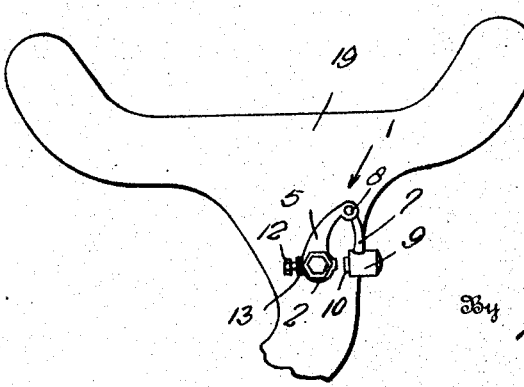
T. Major,
J. J. Jones,
Inventors
By Clarence A. O'Brien
Attorney Patented Sept. 8, 1925.

1,552,860

UNITED STATES PATENT OFFICE.

THOMAS MAJOR AND JOHN J. JONES, OF LANSFORD, PENNSYLVANIA.

AUTOMATIC AUXILIARY AIR-INTAKE VALVE FOR INTERNAL-COMBUSTION ENGINES.

Application filed September 25, 1924. Serial No. 739,861.

*To all whom it may concern:*

Be it known that we, THOMAS MAJOR and JOHN J. JONES, citizens of the United States, residing at Lansford, in the county of Carbon and State of Pennsylvania, have invented certain new and useful Improvements in Automatic Auxiliary Air-Intake Valves for Internal-Combustion Engines, of which the following is a specification.

This invention relates to improvements in air inlet valves for internal combustion engines, and has reference more particularly to an attachment which may be readily and easily installed, whereby a supply of air is automatically delivered to the intake manifold, while the automobile is travelling on a level surface or on a down grade, the valve being of such construction as to automatically maintain a closed position, when the automobile ascends an incline.

A further object of the invention is to provide an automatic auxiliary air intake valve of the above mentioned character, which will reduce the consumption of fuel and further increase the efficiency of the operation of the internal combustion engine.

A further object of the invention is to provide an automatic auxiliary air intake valve of the above mentioned character, which is adapted to be associated with either the suction pipe of an internal combustion engine where a vacuum tank is associated therewith or with the intake manifold when the device is used upon automobiles of the Ford type.

A still further object of the invention is to provide an automatic auxiliary air intake valve of the above mentioned character, which is simple in construction, inexpensive, strong and durable, and further well adapted for the purpose for which it is designated.

Other objects and advantages of this invention will become apparent during the course of the following description.

In the accompanying drawing, forming a part of this specification, and in which like numerals designate like parts throughout the same:

Figure 1 is a side elevation of the automatic auxiliary air intake valve embodying our invention, showing the same mounted on the suction pipe leading from the intake manifold to the vacuum tank.

Figure 2 is a top plan view thereof.

Figure 3 is a sectional view, taken approximately on the line 3—3 of Figure 2, and Figure 4 is a side elevation of the device, showing the same mounted on the intake manifold of a Ford automobile.

In the drawing, wherein for the purpose of illustration is shown the preferred embodiment of our invention, the numeral 1 designates generally the air valve comprising our invention, and the same includes the body member 2, the same being hollow and provided with an air inlet opening 3 in the side thereof, and an air outlet 4 at one end thereof.

Extending upwardly from the intermediate portion of the body 2 and formed integral therewith is the arm 5. The upper end thereof is bifurcated, as illustrated at 6, and provides a means for receiving the upper ends of the lever 7. A pin 8 extends transversely through the bifurcated upper end of the arm 5, and the upper end of the lever 7, whereby the lever is fulcrumed in the bifurcated portion of the arm.

Detachably supported on the lower end of the lever 7 is the counter weight 9. A closure for the air inlet opening 3 in the body 2 is shown at 10, and the same is supported in a suitable recess 11, provided in the end of the counterweight 9 adjacent the body 2. The manner in which the closure 10 cooperates with the air inlet opening 3 will hereinafter be more fully described.

For the purpose of controlling the amount of air being admitted into the hollow body 2 through the air opening 3, a needle valve, such as is shown at 12, is threaded into the body 2, directly opposite the air inlet opening 3. A locking nut 13 is associated with the threaded needle valve 12 for securing the same in the proper adjusted position, as is well known in the art.

When the device is to be used on automobiles which have vacuum tanks associated with the internal combustion engine, the T-coupling 14 is placed in the suction line pipe 15, which leads from the intake manifold 16 of the internal combustion engine 17, to the vacuum tank 18. The arms of the T-shaped coupling 14 are secured to the adjacent ends of the sections of the suction line or pipe 15 and the threaded nipple 4, which forms the outlet of the valve body 2 is threaded into the ledge portion of the T-shaped coupling, in the manner as clearly illustrated in Figure 2 of the drawing.

When the device is to be used in conjunction with automobiles of the Ford type, the threaded nipple 4 of the automatic auxiliary air intake valve 1 is threaded into a suitable opening provided in the intake manifold 19.

Normally the valve is associated with the suction line 15 or the intake manifold 19, in such a manner as to have the closure 10 spaced from the air inlet opening 3, whereby air may be automatically admitted to the valve body and delivered to the suction line or intake manifold, as the case may be, while the automobile is travelling on the level road, or when descending a hill. The additional supply of air to the intake manifold will not only lessen the consumption of fuel, but will also cause the efficient operation of the internal combustion engine. When the automobile upon which the automatic auxiliary air intake valve is mounted ascends a hill, the counter weight 9 will cause the closure 10 to seat against the air inlet opening 3 of the valve body 2, thereby cutting off the further supply of additional air to the internal combustion engine until the automobile has reached the top of a hill, whereupon the closure 10 will again be returned to its normal position in spaced relation to the air inlet opening 3, whereby additional air may be admitted to the body 2 and the internal combustion engine with which the same is associated.

A further use of our device includes a means for removing the carbon from the cylinders of the internal combustion engine, as well as cleaning the spark plugs, without necessitating the removal of the head from the cylinder block. To this end, a rubber hose may be attached to the air inlet opening 3 and the other end of the hose disposed in a suitable receptacle containing a cleaning mixture which may consist of warm water and washing powder, and by permitting the engine to run the cleaning mixture will be sucked through the valve and in turn charged into the cylinder, whereupon the cleaning mixture will come in contact with the carbon and will move the same from the cylinders.

The provision of an automatic auxiliary air intake valve of the above mentioned character enables the same to be readily attached in position on an automobile, without altering the parts thereof to any great extent and when in position thereon, the parts will at all times be positive and efficient in its operation.

While we have shown the preferred embodiment of our invention, it is to be understood that various changes in the size, shape and arrangement of parts may be resorted to, without departing from the spirit of the invention and the scope of the appended claims.

Having thus described our invention, what we claim is:

1. An automatic auxiliary air valve for automobile engines comprising a body having an air inlet and outlet respectively, an arm extending upwardly from the body, a lever pivoted at its upper end to the upper end of the arm, and a counter weight on the lower end of the lever disposed adjacent the air inlet and normally spaced therefrom, said counter weight adapted to seat against the air inlet when the automobile ascends an incline.

2. An automatic auxiliary air intake valve for internal combustion engines of automobiles comprising a body having an air inlet and outlet respectively, an arm extending upwardly from the body, a lever pivoted at its upper end to the upper end of said arm, a counter weight on the lower end of said lever disposed adjacent the air inlet and normally spaced therefrom, said counter weight adapted to seat against the air inlet when the automobile ascends an incline, and a needle valve associated with the air inlet of the body for regulating the amount of air admitted through the inlet.

3. An automatic auxiliary air intake valve for automobile engines comprising a body having an air inlet and outlet respectively, an arm extending upwardly therefrom, the upper end of said arm being bifurcated, a lever fulcrumed at its upper end in the bifurcated portion of the arm, a counter weight on the lower end of the lever, a closure member supported in the end of the counter weight and disposed adjacent the air inlet and normally spaced therefrom, said closure adapted to seat against the air inlet, when the automobile ascends an incline, and a needle valve mounted in the body and cooperating with the air inlet for controlling the amount of air being admitted therethrough.

4. An automatic auxiliary air intake valve for automobile engines comprising a body having an air inlet and outlet respectively, an arm extending upwardly therefrom, the upper end of said arm being bifurcated, a lever fulcrumed at its upper end in the bifurcated portion of the arm, a counter weight on the lower end of the lever, a closure member supported in the end of the counter weight and disposed adjacent the air inlet and normally spaced therefrom, said closure adapted to seat against the air inlet when the automobile ascends an incline, a needle valve mounted in the body and cooperating with the air inlet for controlling the amount of air being admitted therethrough, and an attaching nipple associated with the outlet of the body.

In testimony whereof we affix our signatures.

THOMAS MAJOR.
JOHN J. JONES.